United States Patent
Peters et al.

(10) Patent No.: US 12,318,800 B2
(45) Date of Patent: Jun. 3, 2025

(54) LOW PRESSURE PLURAL COMPONENT SPRAY SYSTEM AND FOAMS GENERATED THEREFROM

(71) Applicant: Spray Foam Systems, LLC, Greensboro, GA (US)

(72) Inventors: Thomas Joseph Peters, Greensboro, GA (US); James F. Peterson, Buckhead, GA (US); David H. Faulkner, Sarasota, FL (US)

(73) Assignee: SPRAY FOAM SYSTEMS, LLC, Greensboro, GA (US)

( * ) Notice: Subject to any disclaimer, the term of this patent is extended or adjusted under 35 U.S.C. 154(b) by 0 days.

(21) Appl. No.: 18/419,914

(22) Filed: Jan. 23, 2024

(65) Prior Publication Data

US 2024/0238816 A1  Jul. 18, 2024

Related U.S. Application Data

(63) Continuation-in-part of application No. 17/834,167, filed on Jun. 7, 2022, now Pat. No. 11,919,025, which
(Continued)

(51) Int. Cl.
*B05B 7/04* (2006.01)
*B05B 7/00* (2006.01)
(Continued)

(52) U.S. Cl.
CPC .......... *B05B 7/0416* (2013.01); *B05B 7/0037* (2013.01); *B05B 7/0043* (2013.01);
(Continued)

(58) Field of Classification Search
CPC .................. B05B 7/0031; B05B 7/0043
See application file for complete search history.

(56) References Cited

U.S. PATENT DOCUMENTS

| 4,060,572 A | 11/1977 | Widmann |
| 4,169,545 A | 10/1979 | Decker |
| (Continued) | | |

OTHER PUBLICATIONS

New Nordson EFD Static Mixer Optimizes Mix performance in a Significantly Shorter Length; website: https://www.nordson.com/en/divisions/efd/about-us/news/new-nordson-efd-static-mixer-optimizes-mix-performance-3-8-16, Mar. 8, 2016, downloaded Jan. 13, 2021.
(Continued)

*Primary Examiner* — Michael P. Rodriguez
(74) *Attorney, Agent, or Firm* — Thomas | Horstemeyer, LLP

(57) ABSTRACT

The disclosure provides methods for preparing a plural component material where part A and part B supplies are delivered from unpressurized storage containers. In use, a continuous stream of high velocity air moves through the static mixing nozzle, and the material streams may be intermittently moved into the nozzle and aerated with an air supply to cause the A and B materials to be mixed with each other and moved with the air to form the plural component materials. The plural component materials are delivered from a static mixing nozzle at pressures of less than 300 psi. Spray guns configured for preparing the plural component materials are also disclosed. Polyurethane foams, polyurethane adhesives, and polyurea coatings prepared by the methods are further provided.

16 Claims, 5 Drawing Sheets

Related U.S. Application Data is a continuation of application No. 15/729,755, filed on Oct. 11, 2017, now Pat. No. 11,383,253.

(60) Provisional application No. 62/407,730, filed on Oct. 13, 2016.

(51) Int. Cl.

| | |
|---|---|
| *B05B 7/16* | (2006.01) |
| *B05B 12/00* | (2018.01) |
| *B05D 1/02* | (2006.01) |
| *B05D 1/34* | (2006.01) |
| *C08J 9/12* | (2006.01) |
| *C08J 9/30* | (2006.01) |
| *E04B 1/76* | (2006.01) |

(52) U.S. Cl.
CPC .......... *B05B 7/0408* (2013.01); *B05B 7/0483* (2013.01); *B05B 7/16* (2013.01); *B05B 12/0026* (2018.08); *B05D 1/02* (2013.01); *C08J 9/122* (2013.01); *C08J 9/30* (2013.01); *E04B 1/76* (2013.01); *B05B 7/1693* (2013.01); *B05D 1/34* (2013.01); *C08J 2201/022* (2013.01); *C08J 2203/06* (2013.01); *C08J 2207/04* (2013.01); *C08J 2375/04* (2013.01)

(56) References Cited

U.S. PATENT DOCUMENTS

| | | |
|---|---|---|
| 5,163,584 A | 11/1992 | Huber |
| 5,529,245 A | 6/1996 | Brown |
| 5,911,545 A * | 6/1999 | Heitkamp ............... E02D 17/20 52/742.16 |
| 6,527,203 B2 | 3/2003 | Hurray |
| 6,533,189 B2 * | 3/2003 | Kott ...................... B05B 7/0861 239/303 |
| 6,705,539 B1 | 3/2004 | Bien |
| 7,717,357 B2 | 5/2010 | Gantenbein |
| 11,383,253 B2 | 7/2022 | Peters |
| 2005/0023296 A1 * | 2/2005 | Bien .................... G05D 11/132 222/146.1 |
| 2005/0035220 A1 | 2/2005 | Brown |
| 2014/0034756 A1 * | 2/2014 | Gantenbein ............ G01K 13/02 239/416.1 |
| 2014/0166775 A1 | 6/2014 | Courier |
| 2016/0184847 A1 | 6/2016 | Hummerlund |

OTHER PUBLICATIONS

Nordson Catalog—2K Product Catalog—Third Edition, issued Oct. 26, 2013.
Google search showing the Emipirefoam catalog was available before Oct. 2016; search performed Jan. 13, 2021.

* cited by examiner

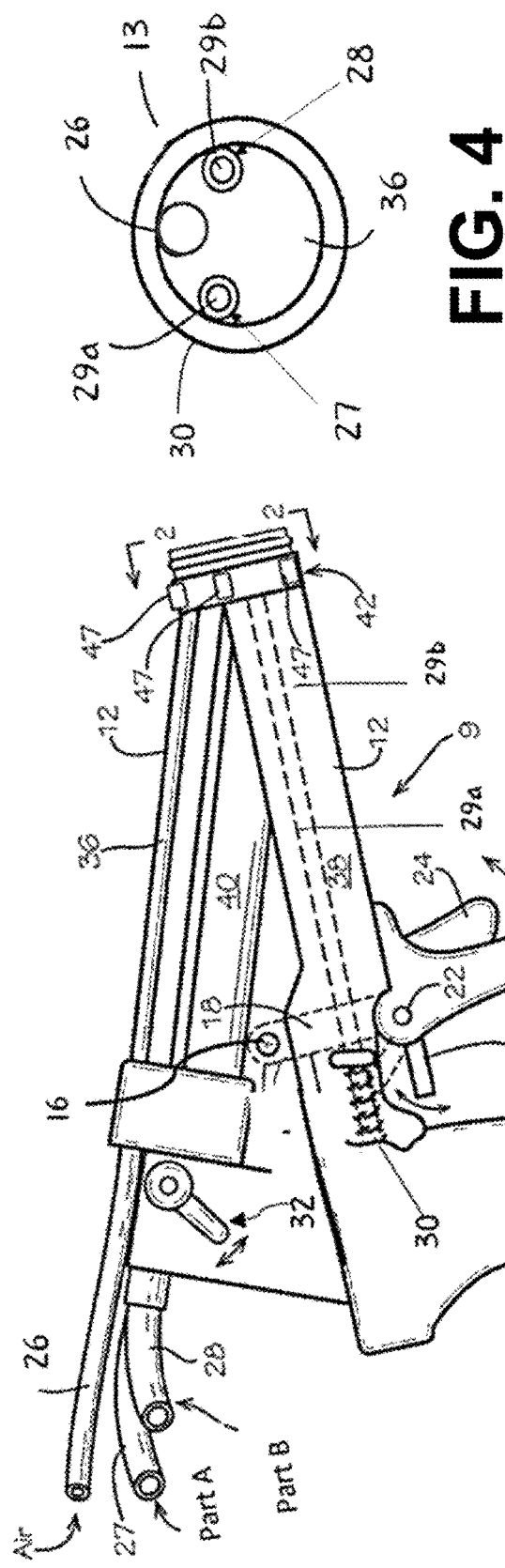
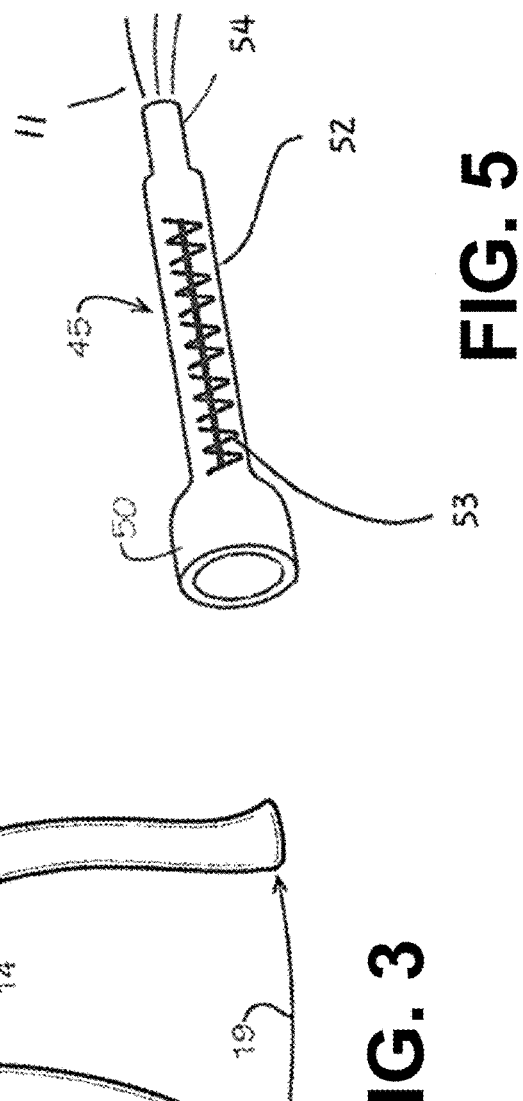
FIG. 4
FIG. 5
FIG. 3

LOW PRESSURE PLURAL COMPONENT SPRAY SYSTEM AND FOAMS GENERATED THEREFROM

CROSS REFERENCE TO RELATED APPLICATIONS

This application is a continuation-in-part of co-pending U.S. patent application Ser. No. 17/834,167, filed Jun. 7, 2022, which is a continuation of U.S. patent application Ser. No. 15/729,755, filed on Oct. 11, 2017, and issued as U.S. Pat. No. 11,383,253, which claims priority to and the benefit of U.S. Provisional Patent Application Ser. No. 62/407,730, filed Oct. 13, 2016. The contents of each of these referenced applications are hereby incorporated by reference in their entireties as if fully set forth herein.

BACKGROUND OF THE DISCLOSURE

For many years, fiberglass has been used as insulation in buildings and other locations where heat loss occurs. Typically, fiberglass is manually applied to walls, ceilings, floors, roofs, air ducts, and pipes, which can generally be termed as "structural surfaces." More recently, spray foam, sometimes referred to as "SPF," has emerged as an alternative to fiberglass for insulation. Plural component SPF can be generated when two chemicals (i.e., parts A and B) are mixed together at a ratio of about 1:1 and sprayed out to form an instant fast set coating material that is used in many different types of applications.

Polyurethane SPF comprises isocyanate and polyol resin as the part A and part B materials supply sources, respectively. The individual liquid components are conveyed from their respective supply sources under pressure to meet at the tip of a spray gun to create a foam that expands. The chemical components—namely the part A and part B materials—react once they have been mixed together. They expand in a few seconds into a foam that attaches to the structural surface. This plural component foam can then be sprayed from the spray gun onto the structural surface to generate an insulation on the surface. Additionally, plural component foam can be applied to roof tiles, concrete slabs, wall cavities, and through drilled holes in a cavity of a finished wall, such as for remodeling jobs.

There are multiple types of polyurethane SPF. The most commonly used are light-density open-cell and medium-density closed-cell spray foam. Both types are thermoset cellular polymers usually comprising millions of small cells. When used as insulation, polyurethane SPF blocks each type of heat transfer: conductive, radiant and convective. Polyurethane SPFs are highly efficient in reducing energy loss, as well as being moisture resistant, mold resistant and noise reducing. Polyurethane SPF insulation can often times be eligible for state and federal energy saving tax deductions.

Polyurethane SPF is also used worldwide in industrial markets for applications such as RV manufacturing, boat manufacturing, mobile home manufacturing, and other types of industrial applications where adhesives, sealants, and insulations are used. In addition, polyurethane SPF is used for geotechnical applications such as void fill and lifting and leveling of surfaces that have sunk due to unstable soils.

Polyurea coatings are a second type of plural component chemistry that is created in a very similar method to that of polyurethane SPF. Some applications include secondary containment in oil fields, roof coatings, truck bed liners, chemical resistant waterproofing, on site lining creation for fracking, waterproofing in pond liners, swimming pool liners, and many other types of applications that may require a seamless, flexible coating that can withstand UV light over time.

High pressure SFP systems use pressures of 800 psi or greater to generate the plural component foam. Such prior art high pressure systems utilize large, complex, arrangements of equipment that use impingement mixing in order to properly mix the chemicals and to achieve adequate mixing and quality finished products. High pressure spray systems typically utilize materials supplies that are stored in fifty-five gallon drums. Transfer pumps can be utilized to feed proportioning systems that convey the parts A and B materials to a spray gun configured with impingement mixing nozzles for product delivery. Because of the high pressures used to achieve impingement mixing, these systems may comprise a hazardous delivery system thus requiring considerable training to safely operate and maintain.

Existing low pressure SPF systems mix the parts A and B materials at 300 pounds per square inch or less. The respective materials supplies are stored in pressurized vessels that are compressed with nitrogen. This compression generates the pressure that conveys the chemicals through the system to allow mixing to occur when the materials meet for delivery in the spray gun applicator. While low pressure SPF systems are considered to be less hazardous than high pressure SPF systems, such low pressure spray processing requires use of the pressurized cylinders, which precludes use of materials supply sources that are unpressurized, such as those that can be delivered from larger volumes, such as drums or totes.

In view of the above, there is a need for improvements in systems to apply SPF, and for plural component materials generated from such systems. The present disclosure provides these and other benefits.

SUMMARY OF THE DISCLOSURE

Aspects of the present disclosure are related to processes and apparatus for generating and applying a foamed mixture of plural component mixtures using low pressure systems, that is, below 300 psi. In one aspect, among others, a method for delivering plural component material from a static mixing nozzle at pressures of less than 300 pounds per square inch ("psi") comprises providing a spray gun applicator configured for dispensing a plural component material from a distal end of a static mixing nozzle engaged at a barrel end of the spray gun, wherein: the spray gun is configured with each of a part A materials conduit, a part B materials conduit, and an air conduit, wherein each conduit extends a length of the spray gun to a spray gun face configured on an interior of an end of the spray gun, wherein the spray gun face is configured with openings for conveyance of each of part A material, part B material, and air; and the spray gun air conduit is operational to allow the air to flow through the spray gun into the static mixing nozzle when the part A and part B materials are both being conveyed and not being conveyed through the respective spray gun materials conduits, wherein the air is provided from an air compressor in communication with the air conduit; conveying the part A and part B materials from their respective unpressurized containers to a proportioner in communications engagement with each container, wherein the proportioner is configured to meter and heat each of the part A and part B materials; metering and heating each of the part A and part B materials; conveying each of the metered and heated part A and part B materials from the proportioner to the spray gun via respective part A and part B materials conduits engaged with the proportioner and extending through a heated hose to the respective part A and part B materials conduits on the spray gun; conveying an amount of air from the air compressor to the spray gun; conveying each of the part A material, part B material, and air through their respective spray gun conduits to exit the spray gun face into a proximate end of the static mixing nozzle; combining each of the parts A and parts B materials in the presence of the air in the proximate end of the static mixing nozzle; conveying the mixed parts A and B and air through the static mixing nozzle; and delivering the plural component material from the distal end of the static mixing nozzle at a pressure of less than 300 psi.

In one or more aspects, the spray gun part A and part B materials conduits can each be configured with retractable pin valves operational to start a flow of each of the parts A and B materials when an operator activates a trigger in mechanical engagement with the retractable pin valves. The static mixing nozzle can be configured with an auger mixing device. The air can continue to flow through the spray gun air conduit and the static mixing nozzle when the retractable pins are engaged in each of the spray gun part A materials and part B materials conduits. Equal amounts of the part A material and part B material can be metered and heated by the proportioner. The spray gun face can include openings for conveying only the part A material, part B material, and air into the static mixing nozzle. Each of first and second unpressurized containers can be in communications engagement with a transfer pump, wherein each transfer pump can be in communications engagement with the proportioner. The first unpressurized container can comprise an isocyanate-containing material and second unpressurized container can comprise a polyol-containing material, thereby providing the plural component material as a polyurethane spray foam. The polyurethane spray foam can be dispensed on a structural surface. The polyurethane spray foam can be injected into a ground location. In various aspects, a polyurethane spray foam insulation can be prepared by these methods. A structural surface can be coated with the polyurethane spray foam insulation. A polyurethane adhesive can be prepared by these methods. A polyurea can be prepared by these methods. A truck bed liner can be coated with the polyurea.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

FIG. 3 is a side view of the applicator spray gun of FIG. 2 with parts removed to illustrate functions of the spray gun.

FIG. 4 is an end view of the applicator spray gun support barrel showing the gun face with the materials and air conduits that exit at the face.

FIG. 5 is a static mixing nozzle that fits onto the end of the spray gun.

DETAILED DESCRIPTION

Figure 1:
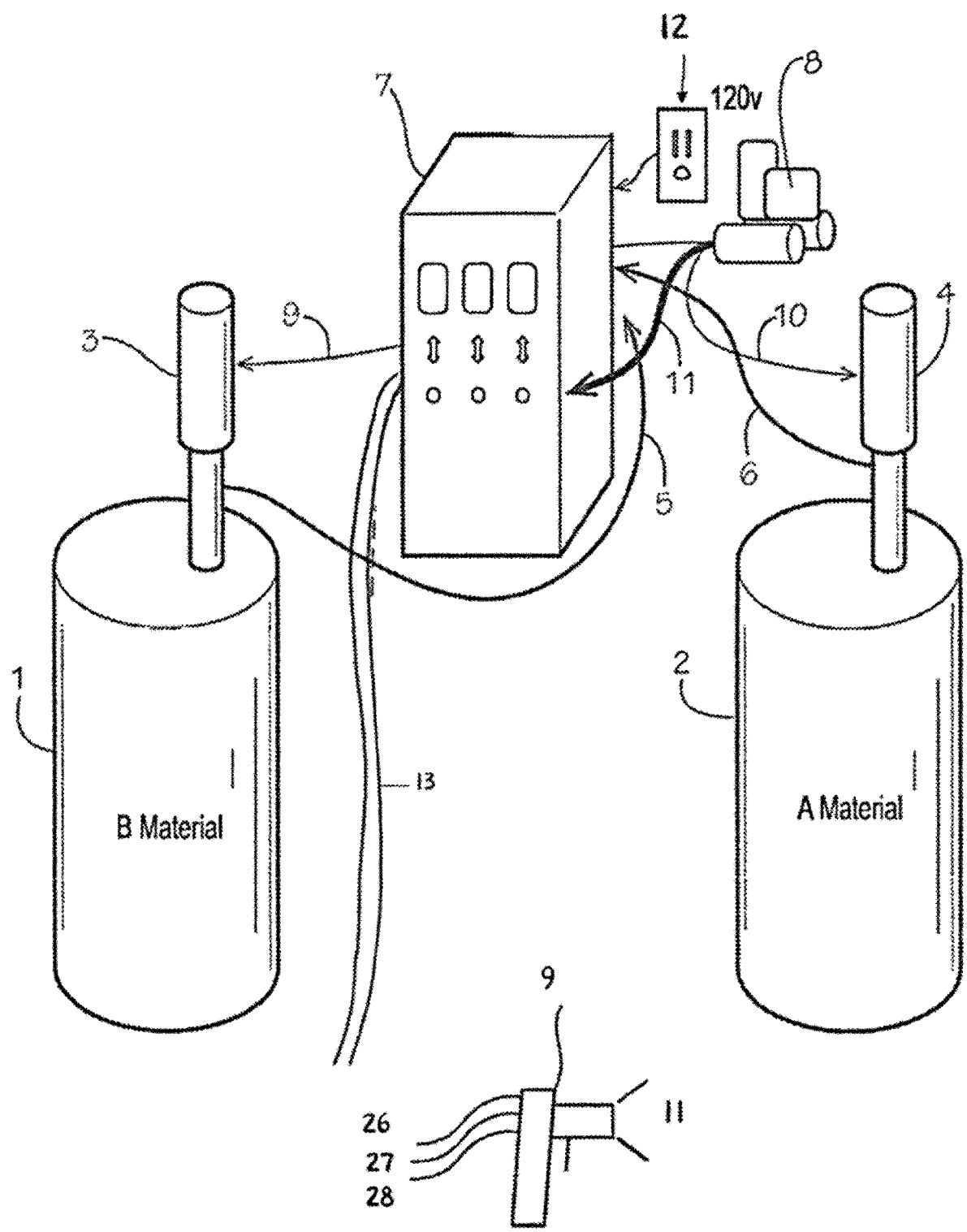
FIG. 1 is a schematic illustration of an equipment configuration in accordance with the methods herein.

The present disclosure provides processes and apparatus for generating and applying a foamed mixture of plural component mixtures using low pressure systems, that is, below 300 psi. The plural component materials can comprise polyurethane foams, polyurethane adhesives, and polyurea coatings.

In use, a continuous stream of high velocity air moves through a spray gun engaged with a static mixing nozzle having an auger mixer therein. Parts A and B material streams are conveyed through conduits in the spray gun from supply sources at flow rates and temperatures provided by a proportioner. The plural components may be intermittently moved into the static mixing nozzle, with air flow into the mixing nozzle being substantially continuous. The mixed materials are moved with the air stream in the static mixing nozzle to form a foam that can be applied to the structural surface, for example. The low-pressure processes herein can also be used as geotechnical foam products for lifting or leveling surfaces, void fill, or soil stabilization.

The disclosure provides a process of using low pressure application—that is, 300 psi or less—of mixed plural component materials from unpressurized containers, where such materials are formulated for use in high pressure applications—that is, at 800 psi or greater. As set out in detail herein, the inventive low-pressure system uses air nucleation of the parts A and B materials at a point in a proximate end of a static mixing nozzle where the plural components enter the from the applicator gun to generate foam mixtures that can be applied to surfaces, etc. The mixing occurs in an intermediate space in the proximate end of the static mixing nozzle and in the interior of the mixing nozzle. Such mixtures are delivered from the end of a static mixing nozzle utilizing significantly lower pressures than used with materials supplies that are delivered from unpressurized material supply sources as in the prior art.

In contrast to prior art low pressure SPF application processes that use pressurized delivery vessels, the system conveys parts A and B materials through the system from unpressurized supply sources. The part A and part B unpressurized supply sources are in communication with each of proportioner that includes a volumetric metering device and a pre-heater which is, in turn, in communication with a heated hose which is, in turn, in communication with a spray gun, where such communication is via respective conduits extending from the unpressurized storage containers through the system to the spray gun for delivery therefrom at pressures less than 300 psi.

The spray gun used in the low-pressure systems herein is configured with a separate air conduit that infuses air together with the plural component material streams in the static mixing nozzle. The spray gun is further configured to provide a continuous flow of air with and without engagement of a trigger on the spray gun applicator—that is, the air flows through the spray gun 100% of operational time. This continuous air flow performs multiple tasks in the system, including air nucleation of the chemical mixing process in the static mixing nozzle as the trigger is engaged by the operator, as well as cleaning of the static mixing nozzle when the parts A and B materials are not flowing through the system, that is, when the spray gun trigger is not engaged by the operator.

Unlike prior art impingement mixing used in high pressure SPF processes, the present disclosure employs a unique mixing process that introduces air into the parts A and B materials streams when the materials enter the static mixing nozzle. This allows air nucleation to occur in the static mixing nozzle which, in turn, allows the chemistry of the materials streams A and B to mix at the proper velocities and ratios, with the delivery of the foams from the end of the nozzle being 300 psi or less. The addition of air from the spray gun allows air to mix with the parts A and B material streams when they enter the proximate end of the static mixing nozzle, as well as increasing the mixing effectiveness when the mixture moves through the static mixing nozzle. This serves to improve the resulting quality of foam product development, even when pressures less than 300 psi are used. The air also assists the spray gun nozzle with pattern development allowing for a clean, consistent pattern to be sprayed onto a substrate at low pressures. This method further provides an air purge feature that can allow the static mixing device to stay clean after the mixed foam has been mixed inside the static mixer. In this regard, upon release of the trigger, the plural component materials flow is stopped, however, the air continues to flow through the static mixer allowing the static mixer nozzle to stay clean longer.

Referring now in more detail to the drawings in which like numerals indicate like parts throughout the several views, FIG. 1 is an illustration of the arrangement of the components that supply the materials A and B supplies from their source and air to the applicator gun.

One of the materials used to generate the foam is stored in container 1 which is a non-pressurized container, which may be a 5, 15, 55, or 250 gallon drum or tote. Likewise, another material used to prepare foam is stored in a non-pressurized container 2 of the same capacities in a drum or tote. As shown, the part B material is in container 1 and the part A material is in container 2. Transfer pumps 3 and 4 are each engaged with unpressurized containers 1 and 2 for urging of the liquid materials through separate conduits 5 and 6 for communication to low pressure proportioner 7. Air compressor 8 is engaged with transfer pumps 3 and 4 via conduits 9 and 10. Air compressor 8 is also engaged with proportioner 7. 120V power source 12 is shown to provide power to the system as shown in FIG. 1. Low pressure proportioner 7 can include electronically controlled preheaters, volumetric metering devices, stroke counters, and pump louver systems. Heated hose 13 includes respective conduits 27 and 28 to convey the part A and part B materials as metered and preheated by proportioner 7 and conduit 26 conveys air from air compressor 8 to spray gun 9. Proportioner 7 is configured to convey the respective part A and part B materials and air to spray gun 9 at the correct amounts, temperature, and flow rate to generate plural component foam 11 therefrom for delivery from spray gun 9 at a pressure of less than 300 psi.

Figure 2:
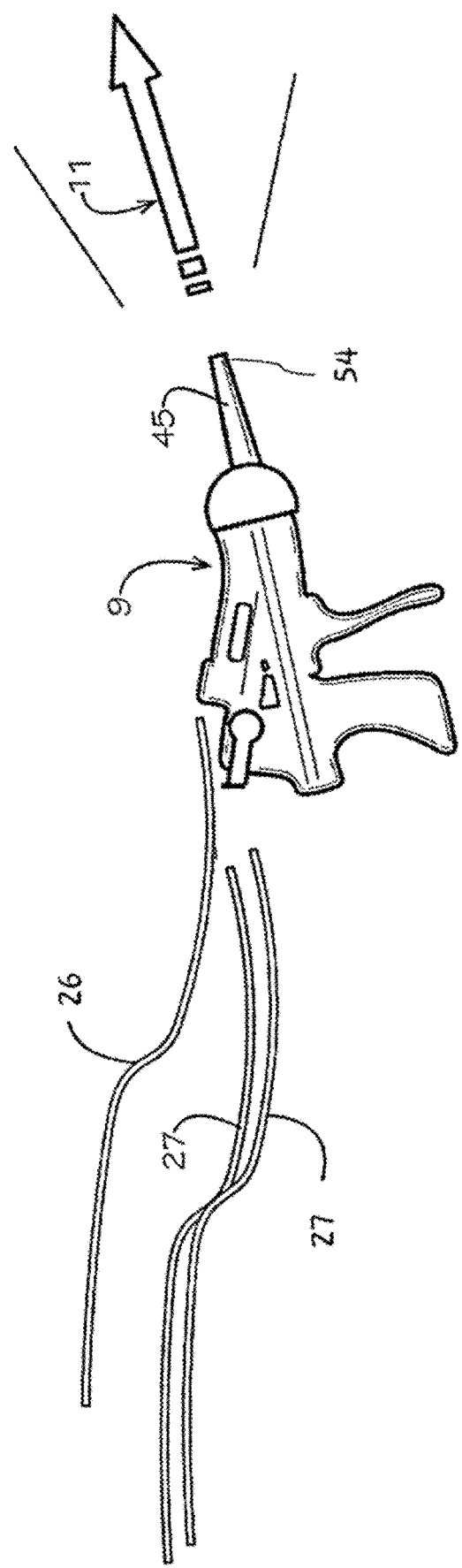
FIG. 2 is a side view of a spray gun that mixes and dispenses the SPF according to the methods herein.

FIG. 2 is a closer view of spray gun 9, showing the three conduits leading from proportioner 7 (not shown) via heated hose 13 (not shown). Part B material enters spray gun 9 via conduit 27. Part A material enters spray gun 9 via conduit 28. Air enters spray gun 9 via conduit 26. As would be appreciated, spray gun 9 will be engageable with conduits 26, 27 and 28 via connections (not shown), where spray gun 9 can be removed as needed. The material streams A and B and air are conveyed to static mixing nozzle 45 to generate foam 11 dispensed from nozzle end 54.

Referring to FIGS. 3 and 4, spray gun 9 includes handle 10 and trigger 14 that is operational to open and close materials conduits 27 and 28 in spray gun face 13. Spray gun face 13 is engaged with spray gun 9 in an interior ring 30 of barrel end 42 at 2-2. Materials conduits 27 and 28 and air conduit 26 are shown, where, in use, such conduits are in communication with the respective supply sources, as shown in FIG. 1. As shown, retractable pins 29a and 29b are engaged in conduits 27 and 28, which means that parts A and B will not flow out of spray gun 9 as configured, as further discussed hereinabove. Remainder 36 of spray gun face 13 does not include further conduits or openings.

Materials conduits 27 and 28 are incorporated in support barrel 40, and air conduit 26 is incorporated in support barrel 36. Lever 32 allows modification of flow rates. Retractable pin valves 29a and 29b are configured on an interior 38 of spray gun 9 and are biased with spring 30 via action of trigger 14 on lever 18 by way of rotational engagement at 16. Trigger lock 20 prevents movement of trigger 14 to prevent delivery of materials A and B out of the respective conduits 28 and 27. When trigger 14 is pulled and trigger lock 24 is not engaged, 20 will rotate around 22 to allow trigger 14 to move as shown by arrows 19. Trigger 14 moves backward and pin valves 29a and 29b retract from materials conduits 27 and 28 to allow the respective materials streams to flow into a static mixing nozzle engaged at gun end 42 via threads 47.

FIG. 5 shows a static mixing nozzle 45 having collar 50 for engagement at barrel end 42 via threads 47. Auger mixer 53 is included on an interior of nozzle barrel 52. In use, plural component foam 11 will be dispensed out of nozzle end 54. When retractable pins 29a and 29b are engaged with conduits 27 and 28, high velocity air delivered from air compressor 8 may continuously be delivered from air conduit 26 to allow static mixing nozzle 45 to be cleaned after foam 11 is generated therefrom.

Figure 6:
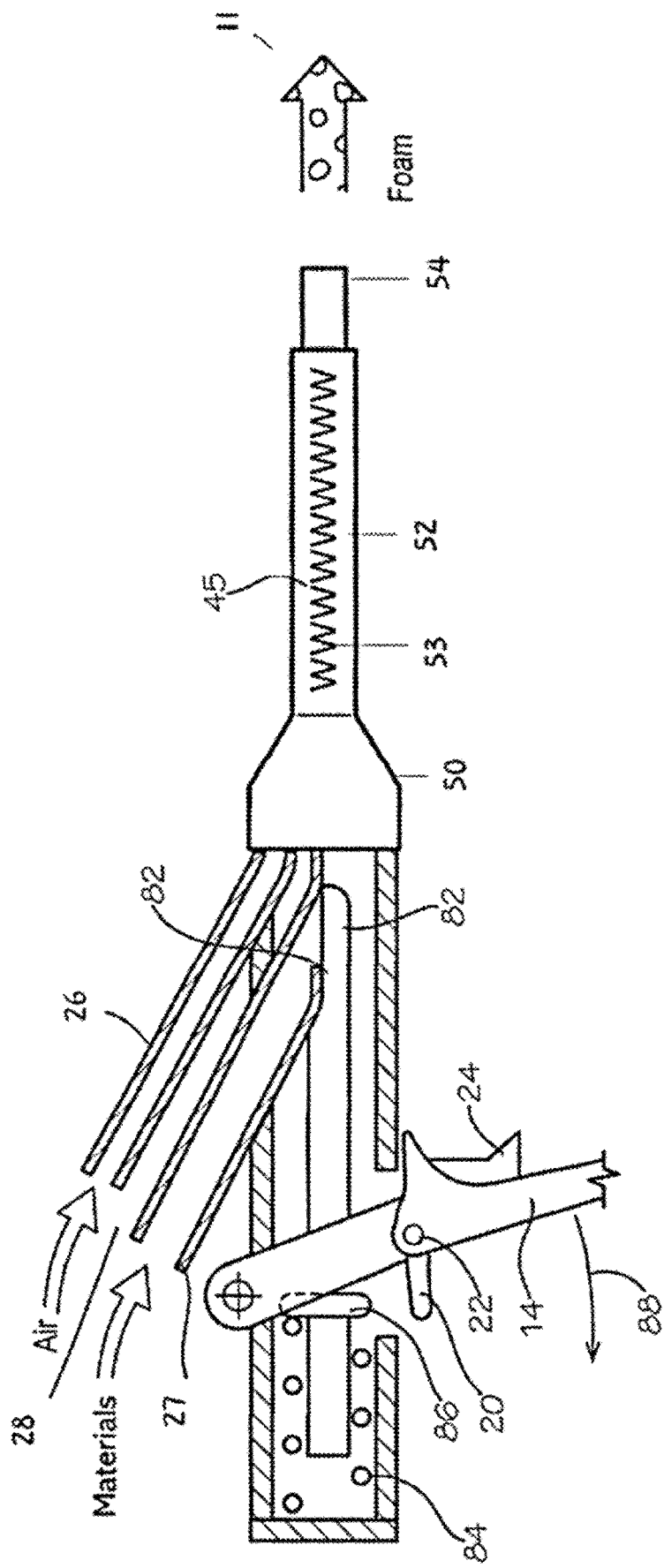
FIG. 6 is a partial cross section of the barrel and valve to show flow of materials streams through the spray gun and static mixing nozzle.

FIG. 6 illustrates operation of the valves of spray gun 9 that operate in response to the movements of trigger 14. Valve plunger 82 is biased by coil compression of spring 84 toward the closed position of the valve plunger. Valve plunger 82 is operational to block parts A and B materials conduits 27 and 28 at gun face 13 via retractable pins 29a and 29b (as shown in FIG. 4), while air conduit 26 remains unblocked to move air continuously into static mixing nozzle 45, as previously described. In use, coil compression spring 84 engages compression ring 86 mounted on valve plunger 82, and the coil compression spring engages and urges the valve 82 into its closed position, as illustrated. When trigger 14 is engaged in the direction as indicated by arrow 88, the trigger is operational to urge valve plunger 82 to pull back retractable pins 29a and 29b to open conduits 27 and 28. This action allows the parts A and B materials (not shown) to move through their respective conduits in response to the pressure applied in the original storage containers via operation of the system as shown in FIG. 1. As noted, air conduit 26 remains open so that gas continuously moves into and through the nozzle 45.

Figure 7:
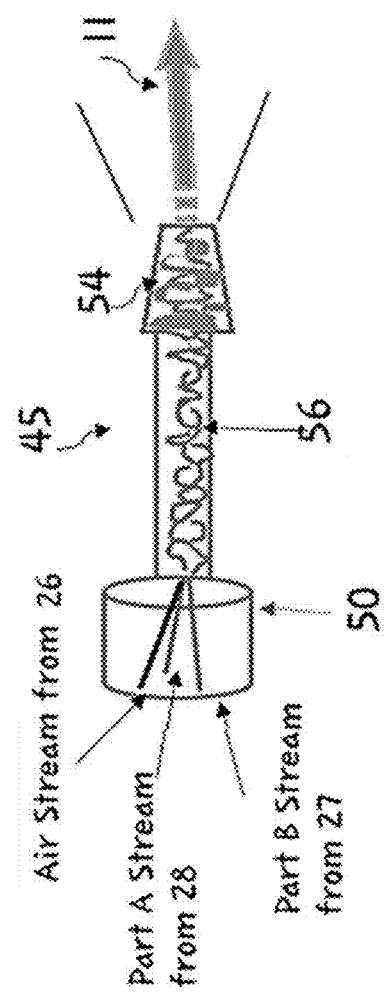
FIG. 7 illustrates how the parts A and B materials streams and air meet in the static mixing nozzle and how the mixture travels through and out of the nozzle.

As shown in FIG. 7, each of the parts A and B and air exit gun face 13 to enter static mixing nozzle collar 50 simultaneously at which point the parts A and B are mixed in barrel 52 with the assistance of the air. (FIG. 7 does not include auger mixer 53 so as to better show the parts A and B mixing process.) As the parts A and B and air are conveyed through the static mixing nozzle barrel 52 to contact the auger mixer (shown as 53 in FIG. 5), a mixed foam 11 will be generated, which will then be delivered from static mixing nozzle end 54 at pressures less than 300 psi. The air delivered into static mixing nozzle 45 also assists pattern development of the foam 11 in order to provide a uniform spray pattern.

Foams delivered from the systems herein can vary according to the materials being used, however, to constitute "low pressure" as used herein, all foams are processed at a pressure of less than 300 psi. A feature of the disclosure is that materials typically processed at pressures of 800-1450 psi (as shown in Table 1 hereinafter), for example, can be processed according to the methods herein at pressures of less than 300 psi. As shown in Table 2, hereinafter the pressures at which the plural components can be processed can be from 140 to 220 psi.

The following Tables illustrate the differences between manufacturer processing instructions for various materials used in prior art high pressure systems and the lower pressures determined by the inventors to generate suitable plural component materials. Product applications tested are currently available products but not capable of being sprayed utilizing prior art low-pressure methods. All of the products listed are currently being sprayed at high pressures utilizing specialized high pressure spray foam equipment.

TABLE 1

High Pressure Application Guidelines (Prior Art)

| Manufacturer #1 | Temperature | Air Assist Pressure | Fluid Pressure |
|---|---|---|---|
| 0.5 LB Open Cell Foam | 130-140° F. | N/A | 1100-1200 PSI |
| 2 LB Closed Cell Foam | 125-130° F. | N/A | 900-1000 PSI |
| 2 LB Closed Cell Foam (2020 Blowing Agent) | 125-130° F. | N/A | 900-1000 PSI |

| Manufacturer #2 | Temperature | Air Assist Pressure | Fluid Pressure |
|---|---|---|---|
| 0.5 LB Open Cell Foam | 125-140° F. | N/A | 1100-1500 PSI |
| 2 LB Closed Cell Foam | 125-135° F. | N/A | 1100-1400 PSI |
| 0.5 LB Open Cell Foam | 115-140° F. | N/A | 800-1450 PSI |

TABLE 2

Low Pressure Application Using Low Pressure Method of Disclosure

| Manufacturer #1 | Temperature | Air Assist Pressure | Fluid Pressure |
|---|---|---|---|
| 0.5 LB Open Cell Foam | 125-145° F. | 60-120 PSI | 140-220 PSI |
| 2 LB Closed Cell Foam | 125-145° F. | 60-120 PSI | 140-220 PSI |
| 2 LB Closed Cell Foam with 2020 Blowing Agent | 125-145° F. | 60-120 PSI | 140-220 PSI |
| 10 LB Closed Cell Foam | 125-145° F. | 60-120 PSI | 140-220 PSI |

| Manufacturer #2 | Temperature | Air Assist Pressure | Fluid Pressure |
|---|---|---|---|
| 0.5 LB Open Cell Foam | 125-145° F. | 40-120 PSI | 140-220 PSI |
| 2 LB Closed Cell Foam | 105-120° F. | 40-120 PSI | 140-220 PSI |
| 0.5 LB Open Cell Foam | 125-145° F. | 40-120 PSI | 140-220 PSI |

Variable spray trials were successfully performed utilizing the low-pressure spray system disclosed herein using different formulations that were intended for use in high pressure spraying systems. The "high pressure" formulations of Table 1 were successfully sprayed by the inventors utilizing the low-pressure spray system process innovation herein. "High pressure" is defined as formulations which technical data and processing guidelines state that the formula must be applied at pressures of 800 PSI or higher. The amount of pressure used to process the formulations varied based on the use case and materials identification, however, all foams in Table 2 were delivered at less than 300 PSI.

Traditional high-pressure formulations use different blowing agents than traditional refillable low-pressure formulations that require more expensive equipment to process and apply. This is the reason that low pressure formulations have been stored in pressurized containers in the past. By way of explanation, the blowing agent will release out of suspension of the product chemistry—that is, the part B material— if the pressure exerted on the formulation drops below 60 PSI. When this happens, the blowing agent turns from a liquid to a gas to quickly evaporate into the atmosphere. Therefore, using prior art methods, it is impossible to store these materials in drums or other types of unpressurized vessels. As shown in Table 2, blowing agent configured for use in 2020 can be used in the low pressure systems herein.

The disclosure further provides a spray gun as described herein for use in low pressure processing of plural component materials used to generate polyurethane foams or polyurea coatings. The spray applicator gun can be configured as a disposable applicator designed to be more easily operated and replaced instead of repaired resulting in a more economical device to purchase and to operate and maintain.

Foams generated from the methods herein can be used to generate closed cell insulation foams, closed cell concrete lifting foams, open cell foam insulation, polyurea high performance coatings, and polyurethane adhesives. Applications for these spray foams generated from the low-pressure methods can be used for insulation and roofing, industrial coatings, truck bed liners, and geotechnical foam injection, ground leveling/lifting, void fill, and soil stabilization.

What is claimed is:

1. A method for delivering plural component material from a static mixing nozzle at pressures of less than 300 pounds per square inch ("psi") comprising:
   a. providing a spray gun configured for dispensing a plural component material from a distal end of a static mixing nozzle engaged at a barrel end of the spray gun, wherein:
      i. the spray gun is configured with each of a part A materials conduit, a part B materials conduit, and an air conduit, wherein each conduit extends a length of the spray gun to a spray gun face configured on an interior of an end of the spray gun, wherein the spray gun face is configured with openings for conveyance of each of part A material, part B material, and air; and
      ii. the spray gun air conduit is operational to allow the air to flow through the spray gun into the static mixing nozzle when the part A and part B materials are both being conveyed through the respective spray gun part A and part B materials conduits and when the part A and part B materials are not being conveyed through the respective spray gun part A and part B materials conduits, wherein the air is provided from an air compressor in communication with the air conduit;

b. conveying the part A and part B materials from their respective unpressurized containers to a proportioner in communications engagement with each container, wherein the proportioner is configured to meter and heat each of the part A and part B materials;

c. metering and heating each of the part A and part B materials;

d. conveying each of the metered and heated part A and part B materials from the proportioner to the spray gun via respective part A and part B materials conduits engaged with the proportioner and extending through a heated hose to the respective part A and part B materials conduits on the spray gun;

e. conveying an amount of air from the air compressor to the spray gun;

f. conveying each of the part A material, part B material, and air through their respective spray gun conduits to exit the spray gun face into a proximate end of the static mixing nozzle;

g. combining each of the parts A and parts B materials flowing from their respective spray gun conduits in the presence of the air flowing from the spray gun air conduit in the proximate end of the static mixing nozzle;

h. conveying the mixed parts A and B and air through the static mixing nozzle; and i. delivering the plural component material from the distal end of the static mixing nozzle at a pressure of less than 300 psi.

2. The method of claim 1, wherein the spray gun part A and part B materials conduits are each configured with retractable pin valves operational to start a flow of each of the parts A and B materials when an operator activates a trigger in mechanical engagement with the retractable pin valves.

3. The method of claim 1, wherein the static mixing nozzle is configured with an auger mixing device.

4. The method of claim 2, wherein the air continues to flow through the spray gun air conduit and the static mixing nozzle when the retractable pins are engaged in each of the spray gun part A materials and part B materials conduits.

5. The method of claim 1, wherein equal amounts of the part A material and part B material are metered and heated by the proportioner.

6. The method of claim 1, wherein the spray gun face includes openings for conveying only the part A material, part B material, and air into the static mixing nozzle.

7. The method of claim 1, wherein each of first and second unpressurized containers is in communications engagement with a transfer pump, wherein each transfer pump is in communications engagement with the proportioner.

8. The method of claim 1, wherein a first unpressurized container comprises an isocyanate-containing material and a second unpressurized container comprises a polyol-containing material, thereby providing the plural component material as a polyurethane spray foam.

9. The method of claim 8, wherein the polyurethane spray foam is dispensed on a structural surface.

10. The method of claim 8, wherein the polyurethane spray foam is injected into a ground location.

11. A polyurethane spray foam insulation prepared by the method of claim 1.

12. A structural surface coated with the polyurethane spray foam insulation of claim 11.

13. A polyurethane adhesive prepared by the method of claim 1.

14. A polyurea prepared by the method of claim 1.

15. A truck bed liner coated with the polyurea of claim 14.

16. The method of claim 1, wherein the spray gun air conduit is operational to allow the air to continuously flow through the spray gun into the static mixing nozzle.

* * * * *